United States Patent Office 3,198,767
Patented Aug. 3, 1965

3,198,767
CONJUGATED ORGANIC POLYMERS
Ken Matsuda, Stamford, Conn., and Lucille T. Morin, St. Blaise-Neuchatel, Switzerland, assignors to American Cyanamid Company, New York, N.Y., a corporation of Maine
No Drawing. Filed Mar. 17, 1961, Ser. No. 96,385
19 Claims. (Cl. 260—65)

This invention relates to a novel class of polymeric resinous materials and to the process for the preparation thereof. More particularly, this invention relates to a novel class of polymeric resinous materials which show a decrease of resistivity with an increase in temperature. Still more particularly, this invention relates to a novel class of linear, conjugated, organic, polymeric, resinous materials which have decreased resistivities at high temperatures and to the process for the preparation thereof.

One of the objects of the present invention is to produce a novel class of polymeric resinous materials.

A further object of the present invention is to produce a novel class of polymeric resinous materials which will have utility as semiconductors and the like due to their low resistivity at high temperatures.

These and other objects of the instant invention will be obvious to one skilled in the art upon reading the more detailed description set forth hereinbelow.

The novel polymeric resinous materials of the present invention may be prepared by condensing (1) a compound selected from the group consisting of (a) those corresponding to the formula (I)

$$\begin{array}{c} H \\ \diagdown \\ H \end{array} N-(Y)_n-N \begin{array}{c} H \\ \diagup \\ H \end{array}$$

wherein $n$ is 0 or 1 and Y is a radical selected from the group consisting of aryl, substituted aryl,

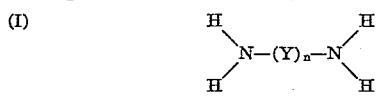

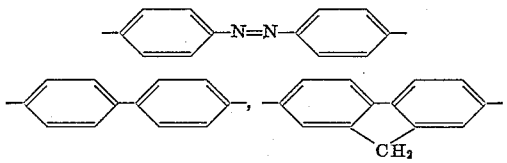

and

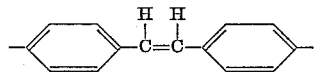

radicals, (b) those corresponding to the formula (II)

$$\begin{array}{c} H \\ \diagdown \\ H \end{array} N-N=C-(Z)_m-C=N-N \begin{array}{c} H \\ \diagup \\ H \end{array}$$
$$\phantom{HN-N=}R\phantom{-(Z)_m-}R$$

wherein $m$ is 0 or 1, R is a substituent selected from the group consisting of hydrogen, —$NH_2$, —OH and —$CH_3$, and Z is a radical selected from the group consisting of

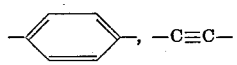, —C≡C— and

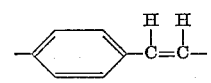

radicals, and (c) Congo red, with (2) a compound selected from the group consisting of (a) those corresponding to the formula (III)

$$O=C-(X)_y-C=O$$
$$\phantom{O=}R^1\phantom{-(X)_y-}R^2$$

wherein $y$ is 0 or 1, $R^1$ and $R^2$ are substituents selected from the group consisting of hydrogen, alkyl radicals containing 1 to 5 carbon atoms, aryl radicals and alkyl-, alkoxy-, and halo-substituted aryl radicals, wherein $R^1$ and $R^2$ are the same or different radicals, and X is a radical selected from the group consisting of

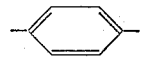

and

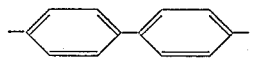

radicals, (b) benzoquinone, (c) 1,4-napthoquinone, (d) 1,2-naphthoquinine, (e) acenaphthenequinone, (f) anthraquinone, (g) phenaphthraquinone, (h) stilbenequinone, and (i) violanthrone, at a temperature of from about —30° C. to about 250° C.; a pressure of from about atmospheric to 100 p.s.i.g.; a mole ratio of reactants (1) and (2), of from about 1 to 2 and about 2 to 1, respectively, in the presence of an inert solvent and at a pH of below 7.

Among the compounds represented by Formula I above are hydrazine, p-phenylenediamine, benzidine, dianisidine, 3,3′-dichlorobenzidine, diaminofluorene, 1,4-diaminonaphthalene, 1,5-diaminonaphthalene, 4,4′-diaminostilbene, 4,4′-diaminoazobenzene and the like.

Among the compounds represented by Formula II, above, are the hydrazides such as oxalic acid dihydrazide, oxalimidic acid dihydrazide, fumaric acid dihydrazide, maleic acid dihydrazide, terephthalic acid dihydrazide, acetylene dicarboxylic acid dihydrazide, p,β-styrene dicarboxylic acid dihydrazide and the dihydrazones of 1,2-dicarbonyl or conjugated dicarbonyl compounds, such as glyoxal dihydrazone and biacetyl dihydrazone.

By the term "Congo red" as used in the specification, examples and claims is meant the compound having the formula

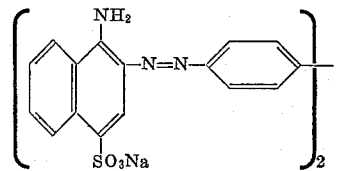

The above-mentioned compounds are those which may be utilized as reactant (1) in the process of the instant invention.

The compounds which may be utilized as reactant (2) in the process of the instant invention and which are represented by Formula III, above, include glyoxal, terephthalaldehyde, diphenyl dialdehyde-(4,4′), p-diacetyl benzene, 4,4′-diacetylbiphenyl, 1,4-dibenzoyl benzene, 4,4′-dibenzoyl biphenyl, 4-formyl acetophenone, biacetyl, 2,3-pentanedione, 2,3-octanedione, 3,4-hexanedione, 3,4-octanedione, 4,5-octanedione, benzyl, 4,4′-dichlorobenzl, di-α-naphthoyl, di-β-naphthoyl, pyruvaldehyde, phenylglyoxal, p-tolylglyoxal, 4-methoxyphenyl glyoxal, 1-phenyl-1,2-propanedione, p-tolyl-benzyl-diketone, ethyl phenyl glyoxal, methyl benzyl glyoxal, β-phenethyl glyoxal, benzyl glyoxal and the like.

Also among the materials which are classified under reactant (2) are the quinones and quinone derivatives mentioned above, as compounds (b) through (i).

When reactants (1) and (2) are condensed in the manner, as set forth hereinabove, linear, conjugated, organic, resinous, polymeric materials are produced comprising recurring units of the following formulae (IV)

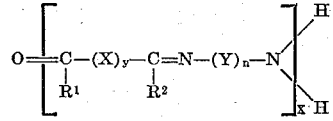

wherein Y, n, X, Y, R¹ and R² are the various radicals and substituents as set forth hereinabove in respect to Formulae I and III and (V)

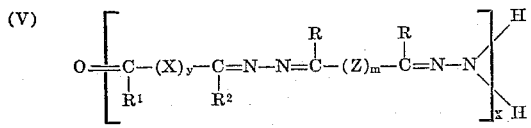

wherein y, m, X, Z, R¹, R² and R are the various radicals and substituents as set forth hereinabove in respect to Formulae II and III.

Similarly, when Congo red is utilized as the compound of reactant (1) the —$NH_2$ groups thereof react with the O=C— groups of reactant (2) to form the resinous polymeric materials of the instant invention and water. The condensation of reactants (1) and reactants (2) always involve the elimination of water as the —$NH_2$ groups and —C=O groups react.

When the quinones and quinone derivatives mentioned above are used as reactant (2) the same reaction, as enumerated above, occurs and results in the production of resinous polymers comprising recurring units of the formulae (VI)

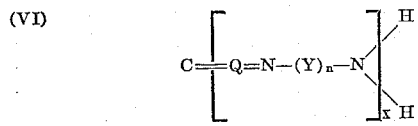

wherein n, and Y are substituents and radicals as set forth in respect to Formula I and Q is a residue or moiety corresponding to the quinone and quinone derivatives as set forth above in regard to reactant (2) and (VII)

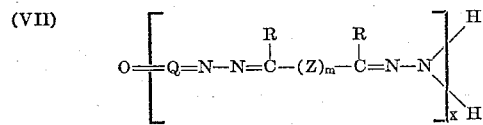

wherein R, Z and m are radicals and substituents set forth above in respect to Formula II and Q is a residue or moiety as set forth above in respect to Formula VI.

All of the above-mentioned polymeric resinous materials are characterized by their property of showing a decrease in resistivity with an increase in temperature.

The process of the instant invention can be carried out under various conditions. The temperature of the process must be in the range of from about −30° C. to about 250° C., although a range of from about 0° C. to about 150° C. is preferred. However, lower temperatures should not be used because of decreased solubility of reactants and decreased reaction rates. Higher temperatures should be avoided because of problems in the decomposition of reactants and products.

The pH of the reaction is not critical and is generally about neutral but when carboxylic or mineral acids, such as acetic acid, hydrochloric acid, and sulfuric acid, are used as catalysts, a slightly acidic pH results.

The process is preferably run in the presence of catalysts, such as those mentioned above, but it is possible to carry out the condensation in the absence of a catalyst under certain circumstances, such as when the two compounds being condensed are extremely reactive. When catalysts such as those mentioned above are used, they are employed in concentrations of about .01% to about 5%, preferably about 0.1% to about 2.0%, in the reaction mixture.

The pressure of the system, during the process of the instant invention, is maintained in the range of from about subatmospheric to about 300 p.s.i.g. and preferably about atmospheric to about 100 p.s.i.g.

The mole ratio of reactants (1) and (2) is critical and should be within the range of from about 1 to 2 to about 2 to 1, respectively, preferably about 1 to 1.2 to about 1.2 to 1, respectively. This range is utilized in order to enable substantially complete reaction to take place between the two reactants and to obtain maximum molecular weights of the polymers.

A compound is generally added during the reaction which is a solvent for both reactants and is also inert in respect to said reactants. Any inert solvent may be used, with water, aliphatic alcohols and ethers, such as diethyl ether and dioxane or mixtures thereof, being preferred. The amount of solvent added is not critical but should be sufficient to dissolve a major portion of each reactant.

The following examples are for purposes of illustration only and are not to be construed as limitations on the instant invention except as indicated in the appended claims. All parts and percentages are by weight unless otherwise indicated.

EXAMPLE 1

Condensation of oxalimidic acid dihydrazide with 1,4-naphthoquinone

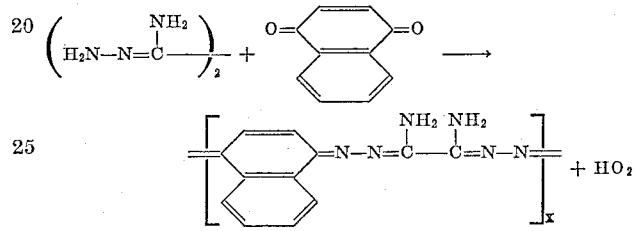

Into a suitable reaction vessel equipped with a stirrer, condenser and thermometer, there is introduced 38.51 parts of oxalimidic acid dihydrazide, and 52.49 parts of naphthoquinone, dissolved in about 1000 parts of absolute ethanol and the charge is heated to 80° C. on a steam bath. The mixture darkens almost immediately to a dark red, then to a dark violet, and finally to black. The alcohol is evaporated and there remains a black shiny solid whose infrared spectrum is consistent with the proposed structure of the polymer. The spectrum indicates a polymeric material with aromatic ortho-substitution but contains no naphthoquinone or oxalimidic acid dihydrazide.

EXAMPLE 2

20.6 parts of naphthoquinone are dissolved in 2000 parts of hot ethanol and added to a hot solution of 15.1 parts of oxalimidic acid dihydrazide in 6000 parts of ethanol and the mixture is added to a reaction vessel equipped as in Example 1. The solution is stirred and heated to 80° C. for 15 hours as a steam bath. Upon filtration of the hot reaction mixture and washing with several portions of alcohol, there is obtained 19.0 parts of a fine black resinous, polymeric powder representing a yield of about 53%.

EXAMPLE 3

Condensation of oxalimidic acid dihydrazide with glyoxal

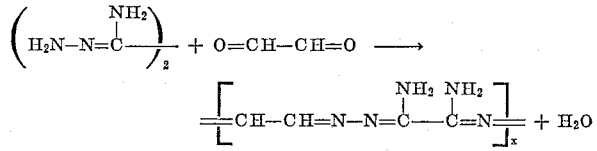

To a solution of 20 parts of oxalimidic acid dihydrazide in 1000 parts of water, made weakly acidic with ½ part of hydrochloric acid, is added 66.7 parts of 30% aqueous glyoxal. There is an immediate yellow fluorescence and the solution becomes quite cloudy. Upon standing 15 hours the mixture had turned brown. Filtration and drying produces a black shiny crystalline material, with a melting point of over 300° C. The black product obtained is shown by its infrared spectrum to be a polymer of the type shown in Formula V above.

The polymers obtained in Examples 1 and 2 are compressed into cylindrical pellets at room temperature in a Carver hydraulic press operating at 15,000 p.s.i. The following results are obtained from the resistance measurements at 90 v.

|  | Room Temp. | Elevated Temp. |
|---|---|---|
| Polymer 1 | $\rho\,25° \gg 1.4 \times 10^{13}$ | $\rho\,128°=3.1 \times 10^{11}$ |
| Polymer 2 | $\rho\,25°=1 \times 10^{13}$ | $\rho\,64°=1.1 \times 10^{12}$ |

(All units are ohm cm.)

These figures show that higher temperatures give lower resistivities for these particular poylmers.

EXAMPLE 4

*Condensation of hydrazine with naphthoquinone*

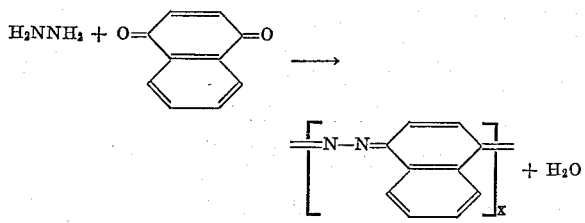

Separate solutions of 1,4-naphthoquinone, 158 parts, and hydrazine, 32 parts, in 1000 parts of ethanol are prepared. The hydrazine solution is added to the hot solution of naphthoquinone and stirred for one hour. The hot product mixture is filtered to yield 50 parts of a black polymeric solid in a 30% yield.

EXAMPLE 5

*Condensation of hydrazine with glyoxal*

32 parts of hydrazine, in 850 parts of water, and acidified with 1 part of HCl are added to 194 parts of 30% glyoxal (in water). The mixture is heated on a steam bath at a temperature of 90° C. and a dark polymeric solid is obtained upon filtering the reaction mixture.

EXAMPLE 6

*Condensation of hydrazine with biacetyl*

The same procedure as in Example 1 is utilized except that 8 parts of hydrazine and 22 parts of biacetyl are used as the starting materials. These materials are dissolved in about 1250 parts of ethanol. After heating the mixture on a steam bath to a temperature of 80° C. and filtering, a dark brown solid is recovered in the yield of about 40%.

EXAMPLE 7

*Condensation of p,β-styrene dicarboxcylic acid dihydrazine with 3,4-octane dione*

The procedure of Example 1 is again followed except that 22 parts of p-β-styrene dicarboxcylic acid dihydrazide and 14 parts of 3,4-octanedione, dissolved in 2000 parts ethanol, are used as the starting materials. After heating to 80° C. and filtering, a hard dark polymeric solid is obtained in a yield of 36%.

EXAMPLE 8

*Condensation of p-β-styrene dicarboxcylic acid dihydrazide with terephthalaldehyde*

In this example, the procedure of Example 1 is again followed except that 22 parts of the p,β-styrene dicarboxcylic acid dihydrazide and 13.5 parts of terephthalaldehyde, dissolved in 1500 parts of ethanol, are used as the starting materials. The materials are heated to 90° C. and filtered. A solid black polymer is recovered in a yield of 41%.

EXAMPLE 9

*Condensation of p-phenylene diamine with 4,4'-diacetyl biphenyl*

To 11 parts of p-phenylene diamine are added 24 parts of 4,4'-diacetyl biphenyl. The mixture is dissolved in 2500 parts of ethanol and filtered, after heating to 100° C. for 15 minutes. A solid black polymeric material is recovered which possesses the low resistivity required of a material useful as a semi-conductor at high temperatures.

EXAMPLE 10

*Condensation of p-phenylene diamine with benzil*

11 parts of p-phenylene diamine and 21 parts of benzil are added to a suitable reaction vessel. 2500 parts of methanol are then added to the vessel in order to dissolve the contents thereof. The vessel is heated to 70° C. on a steam bath for about an hour. The reaction mixture darkens immediately and ends up as a dark liquid which is then filtered. A solid black resinous polymer is recovered in a yield of about 45%.

EXAMPLE 11

*Condensation of p-phenylene diamine with di-α-naphthoyl*

2500 parts of butanol are added to a mixture of 11 parts of p-phenylene diamine and 31 parts of di-α-naphthoyl. The solution is added to a suitable reaction vessel was heated to a temperature of 153° C. The solution turns dark brown in color and upon filtration yields a dark brown, resinous, polymeric material having a melting point of over 300° C.

EXAMPLE 12

*Condensation of dianisidine with 1,4-dibenzoylbenzene*

To a mixture of 25 parts dianisidine and 29 parts of 1,4-dibenzoylbenzene are added 2500 parts of ethanol. This solution is treated as in Example 11, above, and upon filtration, yields a dark polymeric solid in a yield of 46%.

EXAMPLE 13

*Condensation of dianisidine with pyruvaldehyde*

The procedure of Example 11 is again followed except that 25 parts of dianisidine and 7 parts of pyruvaldehyde, in 1500 parts of ethanol, are used as the starting materials. Upon recovery by filtration, a yield of 31% of a solid, black, polymeric material is obtained.

EXAMPLE 14

*Condensation of 3,3'-dichlorobenzidine with p-tolyl glyoxal*

25 parts of 3,3'-dichlorobenzidine and 15 parts of p-tolyl glyoxal, in 2500 parts of ethanol, are also reacted in the manner set forth in Example 11, above. Upon filtration, 40% of a solid brown polymeric material is realized.

EXAMPLE 15

*Condensation of 3,3'-dichlorobenzidine with 1-phenyl-1,2-propane dione*

As starting materials, 25 parts of 3,3'-dichlorobenzidine and 15 parts of 1-phenyl-1,2-propane dione, in 2500 parts of ethanol, are substituted for those starting materials of Example 11, above, and the solution is then treated as in Example 11. A yield of 43% of a solid black polymeric compound is realized.

EXAMPLE 16

*Condensation of benzidine with 4-formyl acetophanone*

A solution of benzidine and 15 parts of 4-formyl acetophanone, in 2000 parts of ethanol, is added to a suitable reaction vessel. The vessel is heated to a temperature of 120° C. for approximately 1 hour and the color of the solution gradually darkens. Upon filtration of the dark material, a brown solid resinous polymer is recovered in a yield of 63%.

EXAMPLE 17

*Condensation of benzidine and 4,4'-dichlorobenzil*

The same procedure of Example 16 is followed except that a solution of 18 parts benzidine and 28 parts of 4,4'-dichlorobenzil, in 2500 parts of ethanol, is used as the starting mixture. Again a dark resinous solid polymer is recovered upon filtration of the resultant solution.

EXAMPLE 18

*Condensation of 1,4-diaminonaphthalene with 4,4'-dimethyl benzil*

The same procedure of Example 16 is again followed but 16 parts of 1,4-diaminonaphthalene and 24 parts of 4,4'-dimethyl benzil, in 2500 parts of ethanol, are substituted for the starting materials. When the solution is filtered after reaction, a dark polymeric material is recovered in a yield of 57%.

EXAMPLE 19

*Condensation of 1,4-diaminonaphthalene with 4,4'-dimethoxy benzil*

A solution of 16 parts of 1,4-diaminonaphthalene and 27 parts of 4,4'-dimethoxy benzil, in 200 parts of ethanol, are substituted for the starting materials of Example 16. The procedure of Example 16 is followed and a dark, resinous, solid polymer is recovered upon filtration.

EXAMPLE 20

*Condensation of 4,4'-diamino stilbene with benzoquinone*

To a mixture of 11 parts of benzoquinone and 21 parts of 4,4'-diaminostilbene are added 2000 parts of ethanol. The resultant solution is transferred to a suitable reaction vessel and heated to a temperature of 120° C. The color of the solution changes from a cloudy yellow to a dark black after 45 minutes of heating. The solution, after evaporation of a portion of the ethanol, is filtered on a suction type filter apparatus. 39% of a dark, solid, resinous polymer is recovered.

EXAMPLE 21

*Condensation of 4,4'-diaminofluorene with 1,4-naphthoquinone*

The procedure of Example 20 is carried out utilizing, in place of the starting materials thereof, 16 parts of 1,4-naphthoquinone and 20 parts of 4,4'-diaminofluorene, in 2500 parts of ethanol. Again a dark solid polymeric mass is recovered on filtration.

EXAMPLE 22

*Condensation of oxalic acid dihydrazide with 1,2-naphthoquinone*

The procedure of Example 20 is again followed, however, a solution of 1500 parts of ethanol, 12 parts of oxalic acid dihydrazide and 16 parts of 1,2-naphthoquinone are used as the starting materials. After heating and filtering, as in Example 20, a dark polymer solid is recovered in a yield of 46%.

EXAMPLE 23

*Condensation of oxalimidic acid dihydrazide with acenaphthenequinone*

Utalizing the procedure of Example 20, a solution of 20 parts of oxalimidic acid dihydrazide and 18 parts of acenaphthenequinone, in 2500 parts of ethanol, is treated and a solid black resinous polymeric product, in a yield of 73%, is recovered.

EXAMPLE 24

*Condensation of terephthalic acid dihydrazide with anthraquinone*

19 parts of terephthalic acid dihydrazide and 21 parts of anthraquinone are dissolved in 3000 parts of ethanol and reacted according to the procedure of Example 20. Upon filtration, a recovery of 36% of a dark polymeric material, solid in form, is realized.

EXAMPLE 25

*Condensation of glyoxal dihydrazone with phenanthraquinone*

According to the procedure of Example 20, 9 parts of glyoxal dihydrazone and 21 parts of phenanthraquinone, in 3000 parts of ethanol, are reacted. Upon recovery of the solid polymeric mass formed from the solution by filtration, a yield of 61% is realized.

EXAMPLE 26

*Condensation of biacetyl dihydrazone with stilbenequinone*

In this example, the procedure of Example 20 is again followed, although the starting materials of 11 parts of diacetyl dihydrazone and 21 parts of stilbenequinone, in 3000 parts of ethanol, are substituted for those of Example 20. A dark solid polymeric material is recovered, which when analyzed has a resistivity which would enable the use thereof as a semiconductor.

EXAMPLE 27

*Condensation of Congo red and violanthrone*

Utilizing the procedure of Example 20, 7 parts of Congo red and 5 parts of violanthrone, in 2000 parts of a water-ethanol solution (50–50 by volume), are reacted. After purification and recovery, 33% of a dark solid polymeric material is collected.

EXAMPLE 28

*Condensation of acetylene dicarboxylic acid dihydrazide with ethyl phenyl glyoxal*

A solution of 2000 parts of ethanol, having dissolved therein 14 parts of acetylene dicarboxylic acid dihydrazide and 16 parts of ethyl phenyl glyoxal, is treated in accordance with the procedure of Example 20. Upon analysis, 38% of a solid black material is recovered after filtration of the treated solution.

We claim:

1. A process for preparation of linear, conjugated, organic polymers which consists essentially of reacting (1) a compound selected from the group consisting of (a) hydrazine, (b) those corresponding to the formula $$\begin{matrix} H & & H \\ \diagdown & & \diagup \\ & N-Y-N & \\ \diagup & & \diagdown \\ H & & H \end{matrix}$$

wherein Y is a radical selected from the group consisting of aryl, substituted aryl, <chemical structures: -C6H4-N=N-C6H4-, -C6H4-C6H4-, fluorene with CH2> and

<chemical structure: -C6H4-CH=CH-C6H4-> radicals, (c) those corresponding to the formula $$\begin{matrix} H & & R & R & & H \\ \diagdown & & | & | & & \diagup \\ & N-N=C-C=N-N & \\ \diagup & & & & \diagdown \\ H & & & & H \end{matrix}$$

(d) those corresponding to the formula $$\begin{array}{c} H \\ \diagdown \\ H \end{array} N-N=\underset{R}{C}-Z-\underset{R}{C}=N-N\begin{array}{c} \diagup H \\ \diagdown H \end{array}$$

wherein R is a substituent selected from the group consisting of hydrogen, —$NH_2$, —OH and —$CH_3$, radicals and Z is a radical selected from the group consisting of

—⟨⟩—, —C≡C— and

—⟨⟩—$\underset{\underset{H}{|}}{C}$=$\underset{\underset{H}{|}}{C}$— radicals and (e) Congo red, with (2) a compound selected from the group consisting of (a) those corresponding to the formula $$O=\underset{\underset{R^1}{|}}{C}-\underset{\underset{R^2}{|}}{C}=O$$

(b) those corresponding to the formula $$O=\underset{\underset{R^1}{|}}{C}-X-\underset{\underset{R^2}{|}}{C}=O$$

wherein $R^1$ and $R^2$ are substituents selected from the group consisting of hydrogen, alkyl radicals containing 1–5 carbon atoms, inclusive, aryl radicals and alkyl-, alkoxy-, and halo- substituted aryl radicals and X is a radical selected from the group consisting of

—⟨⟩— and

—⟨⟩—⟨⟩— radicals, (c) benzoquinone, (d) 1,4-naphthoquinone, (e) 1,2-naphthoquinone, (f) acenaphthenequinone, (g) anthraquinone, (h) phenanthraquinone, (i) stilbenequinone and (j) violanthrone at a temperature of from about —30° C. to about 250° C., a pressure of from about atmospheric to 100 p.s.i.g., a mole ratio of reactants (1) and (2) of from about 1 to 2 to about 2 to 1, in the presence of an inert solvent and at a pH of below about 7.

2. A process for the preparation of a linear, conjugated, organic polymer which consists essentially of reacting oxalimidic acid dihydrazide with 1,4-naphthoquinone at a temperature of from about —30° C. to about 250° C., a pressure of from about atmospheric to about 100 p.s.i.g., a mole ratio of from about 1 to 2 to about 2 to 1, respectively, and in the presence of an inert solvent.

3. A process for the preparation of a linear, conjugated, organic polymer which consists essentially of reacting oxalimidic acid dihydrazide with glyoxal at a temperature of from about —30° C. to about 250° C., a pressure of from about atmospheric to about 100 p.s.i.g., a mole ratio of from about 1 to 2 to about 2 to 1, respectively, and in the presence of an inert solvent.

4. A process for the preparation of a linear, conjugated, organic polymer which consists essentially of reacting hydrazine with naphthoquinone at a temperature of from about —30° C. to about 250° C., a pressure of from about atmospheric to about 100 p.s.i.g., a mole ratio of from about 1 to 2 to about 2 to 1, respectively, and in the presence of an inert solvent.

5. A linear, conjugated, organic polymer consisting essentially of recurring units of the formula $$\left[ O=\underset{\underset{R^1}{|}}{C}-\underset{\underset{R^2}{|}}{C}=N-N\begin{array}{c} \diagup H \\ \diagdown \end{array} \right]_x H$$

wherein $R^1$ and $R^2$ are substituents selected from the group consisting of hydrogen, alkyl radicals containing 1–5 carbon atoms, inclusive, aryl radicals and alkyl-, alkoxy-, and halo-substituted aryl radicals and x is the number of recurring units in the polymer.

6. A linear, conjugated, organic polymer consisting essentially of recurring units of the formula $$\left[ O=\underset{\underset{R^1}{|}}{C}-X-\underset{\underset{R^2}{|}}{C}=N-N\begin{array}{c} \diagup H \\ \diagdown \end{array} \right]_x H$$

wherein $R^1$ and $R^2$ are substituents selected from the group consisting of hydrogen, alkyl radicals containing 1–5 carbon atoms, inclusive, aryl radicals and alkyl-, alkoxy- and halo-substituted aryl radicals, x is the number of recurring units in the polymer and X is a radical selected from the group consisting of

—⟨⟩— and

—⟨⟩—⟨⟩— radicals.

7. A linear, conjugated, organic polymer consisting essentially of recurring units of the formula $$\left[ O=\underset{\underset{R^1}{|}}{C}-\underset{\underset{R^2}{|}}{C}=N-Y-N\begin{array}{c} \diagup H \\ \diagdown \end{array} \right]_x H$$

wherein $R^1$ and $R^2$ are substituents selected from the group consisting of hydrogen, alkyl radicals containing 1–5 carbon atoms, inclusive, aryl radicals and alkyl-, alkoxy- and halo-substituted aryl radicals, Y is a radical selected from the group consisting of aryl, substituted aryl,

—⟨⟩—N=N—⟨⟩—, —⟨⟩—⟨⟩—⟨⟩—,

—⟨⟩⟨⟩—
   $CH_2$ and

—⟨⟩—$\underset{\underset{H}{|}}{C}$=$\underset{\underset{H}{|}}{C}$—⟨⟩— radicals and x is the number of recurring units in the polymer.

8. A linear, conjugated, organic polymer consisting essentially of recurring units of the formula $$\left[ O=\underset{\underset{R^1}{|}}{C}-X-\underset{\underset{R^2}{|}}{C}=N-Y-N\begin{array}{c} \diagup H \\ \diagdown \end{array} \right]_x H$$

wherein $R^1$ and $R^2$ are substituents selected from the group consisting of hydrogen, alkyl radicals containing 1–5 carbon atoms, inclusive, aryl radicals and alkyl-, alkoxy- and halo-substituted aryl radicals, Y is a radical selected from the group consisting of aryl, substituted aryl,

—⟨⟩—N=N—⟨⟩—, —⟨⟩—⟨⟩—⟨⟩—,

—⟨⟩⟨⟩—
   $CH_2$ and $$-\!\!\left\langle\!\!\bigcirc\!\!\right\rangle\!\!-\!\!\underset{H}{\overset{H}{\text{C}}}\!=\!\underset{H}{\overset{H}{\text{C}}}\!-\!\!\left\langle\!\!\bigcirc\!\!\right\rangle\!\!-$$

radicals, X is selected from the group consisting of $$-\!\!\left\langle\!\!\bigcirc\!\!\right\rangle\!\!-$$

and $$-\!\!\left\langle\!\!\bigcirc\!\!\right\rangle\!\!-\!\!\left\langle\!\!\bigcirc\!\!\right\rangle\!\!-$$

radicals and $x$ is the number of recurring units in the polymer.

9. A linear, conjugated, organic polymer consisting essentially of recurring units of the formula $$\left[ O\!=\!\!\left\langle\!\!\bigcirc\!\!\bigcirc\!\!\right\rangle\!\!=\!N\!-\!N\!=\!\!\underset{\text{NH}_2}{\overset{\text{NH}_2}{\text{C}}}\!-\!\!\underset{\text{}}{\overset{\text{NH}_2}{\text{C}}}\!=\!N\!-\!N\!\!\diagdown\!\!\underset{H}{\overset{H}{}} \right]_x$$

wherein $x$ is the number of recurring units in the polymer.

10. A linear, conjugated, organic polymer consisting essentially of recurring units of the formula $$\left[ O\!=\!CH\!-\!CH\!=\!N\!-\!N\!=\!\underset{\text{NH}_2}{\overset{\text{NH}_2}{\text{C}}}\!-\!\!\underset{\text{}}{\overset{\text{NH}_2}{\text{C}}}\!=\!N\!-\!N\!\!\diagdown\!\!\underset{H}{\overset{H}{}} \right]_x$$

wherein $x$ is the number of recurring units in the polymer.

11. A linear, conjugated, organic polymer consisting essentially of recurring units of the formula $$\left[ \underset{H}{\overset{H}{\text{N}}}\!-\!N\!=\!\!\left\langle\!\!\bigcirc\!\!\bigcirc\!\!\right\rangle\!\!=\!O \right]_x$$

wherein $x$ is the number of recurring units in the polymer.

12. A linear, conjugated, organic polymer consisting essentially of recurring units of the formula $$\left[ O\!=\!\!\underset{R^1}{\overset{R}{\text{C}}}\!-\!\underset{R^2}{\overset{R}{\text{C}}}\!=\!N\!-\!N\!=\!\underset{}{\overset{}{\text{C}}}\!-\!\underset{}{\overset{}{\text{C}}}\!=\!N\!-\!N\!\!\diagdown\!\!\underset{H}{\overset{H}{}} \right]_x$$

wherein R is a substituent selected from the group consisting of hydrogen, —NH$_2$, —OH and —CH$_3$ radicals, R$^1$ and R$^2$ are substituents selected from the group consisting of hydrogen, alkyl radicals containing 1–5 carbon atoms, inclusive, aryl radicals and alkyl-, alkoxy- and halo-substituted aryl radicals and $x$ is the number of recurring units in the polymer.

13. A linear, conjugated, organic polymer consisting essentially of recurring units of the formula $$\left[ O\!=\!\!\underset{R^1}{\overset{R}{\text{C}}}\!-\!X\!-\!\underset{R^2}{\overset{R}{\text{C}}}\!=\!N\!-\!N\!=\!\underset{}{\overset{}{\text{C}}}\!-\!\underset{}{\overset{}{\text{C}}}\!=\!N\!-\!N\!\!\diagdown\!\!\underset{H}{\overset{H}{}} \right]_x$$

wherein R is a substituent selected from the group consisting of hydrogen, —NH$_2$, —OH and —CH$_3$ radicals, R$^1$ and R$^2$ are substituents selected from the groups consisting of hydrogen, alkyl radicals containing 1–5 carbon atoms, inclusive, aryl radicals and alkyl-, alkoxy- and halo-substituted aryl radicals, and $x$ is the number of recurring units in the polymer and X is a radical selected from the group consisting of $$-\!\!\left\langle\!\!\bigcirc\!\!\right\rangle\!\!-$$

and $$-\!\!\left\langle\!\!\bigcirc\!\!\right\rangle\!\!-\!\!\left\langle\!\!\bigcirc\!\!\right\rangle\!\!-$$

radicals.

14. A linear, conjugated, organic polymer consisting essentially of recurring units of the formula $$\left[ O\!=\!\!\underset{R^1}{\overset{R}{\text{C}}}\!-\!\underset{R^2}{\overset{R}{\text{C}}}\!=\!N\!-\!N\!=\!\underset{}{\overset{}{\text{C}}}\!-\!Z\!-\!\underset{}{\overset{}{\text{C}}}\!=\!N\!-\!N\!\!\diagdown\!\!\underset{H}{\overset{H}{}} \right]_x$$

wherein R is a substituent selected from the group consisting of hydrogen, —NH$_2$, —OH and —CH$_3$ radicals, R$^1$ and R$^2$ are substituents selected from the group consisting of hydrogen, alkyl radicals containing 1–5 carbon atoms, inclusive, aryl radicals and alkyl-, alkoxy- and halo-substituted aryl radicals, $x$ is the number of recurring units in the polymer and Z is a radical selected from the group consisting of $$-\!\!\left\langle\!\!\bigcirc\!\!\right\rangle\!\!-, \quad -\text{C}\!\equiv\!\text{C}-$$

and $$-\!\!\left\langle\!\!\bigcirc\!\!\right\rangle\!\!-\!\underset{H}{\overset{\text{C}=\text{C}}{}}\!-$$

radicals.

15. A linear, conjugated, organic polymer consisting essentially of recurring units of the formula $$\left[ O\!=\!\!\underset{R^1}{\overset{R}{\text{C}}}\!-\!X\!-\!\underset{R^2}{\overset{R}{\text{C}}}\!=\!N\!-\!N\!=\!\underset{}{\overset{}{\text{C}}}\!-\!Z\!-\!\underset{}{\overset{}{\text{C}}}\!=\!N\!-\!N\!\!\diagdown\!\!\underset{H}{\overset{H}{}} \right]_x$$

wherein R is a substituent selected from the group consisting of hydrogen, —NH$_2$, —OH and —CH$_3$ radicals, R$^1$ and R$^2$ are substituents selected from the group consisting of hydrogen, alkyl radicals containing 1–5 carbon atoms, inclusive, aryl radicals and alkyl-, alkoxy- and halo-substituted aryl radicals, $x$ is the number of recurring units in the polymer, X is a radical selected from the group consisting of $$-\!\!\left\langle\!\!\bigcirc\!\!\right\rangle\!\!-$$

and $$-\!\!\left\langle\!\!\bigcirc\!\!\right\rangle\!\!-\!\!\left\langle\!\!\bigcirc\!\!\right\rangle\!\!-$$

radicals and Z is a radical selected from the group consisting of $$-\!\!\left\langle\!\!\bigcirc\!\!\right\rangle\!\!-, \quad -\text{C}\!\equiv\!\text{C}-$$

and $$-\!\!\left\langle\!\!\bigcirc\!\!\right\rangle\!\!-\!\underset{H}{\overset{\text{C}=\text{C}}{}}\!-$$

radicals.

16. A linear, conjugated, organic polymer consisting essentially of recurring units of the formula $$\left[ O\!=\!Q\!=\!N\!-\!N\!\!\diagdown\!\!\underset{H}{\overset{H}{}} \right]_x$$

wherein Q is a quinone residue selected from the group consisting of benzoquinone, 1,4-naphthoquinone, 1,2-naphthoquinone, acenaphthenequinone, anthraquinone, phenanthroquinone, stilbenequinone and violanthrone residues and $x$ is the number of recurring units in the polymer.

17. A linear, conjugated, organic polymer consisting essentially of recurring units of the formula

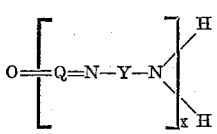

wherein Q is a quinone residue selected from the group consisting of benzoquinone, 1,4-naphthoquinone, 1,2-naphthoquinone, acenaphthenequinone, anthraquinone, phenanthroquinone, stilbenequinone, and violanthrone residues, Y is a radical selected from the group consisting of aryl, substituted aryl,

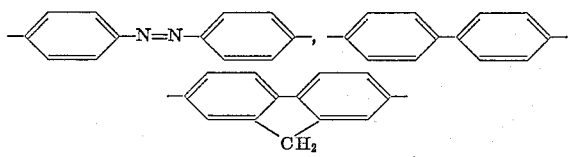

and

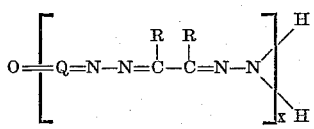

radicals and $x$ is the number of recurring units in the polymer.

18. A linear, conjugated, organic polymer consisting essentially of recurring units of the formula

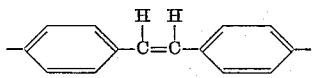

wherein Q is a quinone residue selected from the group consisting of benzoquinone, 1,4-naphthoquinone, 1,2-naphthoquinone, acenaphthenequinone, anthraquinone, phenanthroquinone, stilbenequinone, and violanthrone residues, R is a substituent selected from the group consisting of hydrogen, —NH$_2$, —OH and —CH$_3$ radicals and $x$ is the number of recurring units in the polymer.

19. A linear, conjugated, organic polymer consisting essentially of recurring units of the formula

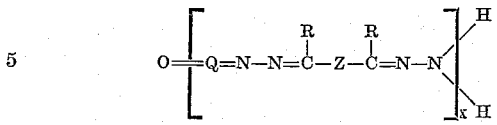

wherein Q is a quinone residue selected from the group consisting of benzoquinone, 1,4-naphthoquinone, 1,2-naphthoquinone, acenaphthenequinone, anthraquinone, phenanthroquinone, stilbenequinone and violanthrone residues, R is a substituent selected from the group consisting of hydrogen, —NH$_2$, —OH and —CH$_3$ radicals, Z is a radical selected from the group consisting of

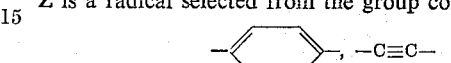

and

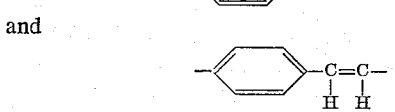

radicals and $x$ is the number of recurring units in the polymer.

References Cited by the Examiner

UNITED STATES PATENTS

| | | | |
|---|---|---|---|
| 2,089,302 | 8/37 | Semon et al. | 260—65 |
| 2,509,183 | 5/50 | Auten | 260—67.6 |
| 2,845,400 | 7/58 | Rudner | 260—69 |
| 2,895,944 | 7/59 | Mark | 260—65 |

FOREIGN PATENTS

| | | |
|---|---|---|
| 774,794 | 5/57 | Great Britain. |

OTHER REFERENCES

Helv. Chim. Acta, vol. 29, pages 1765–82 (1946) (in German), as abstracted from Chemical Abstracts, vol. 41, page 2411c, Apr. 20, 1947.

Kunststoffe, vol. 53, July 1963, pp. 424–436, English translation available ibid., pp. 11–21.

WILLIAM H. SHORT, *Primary Examiner.*

HAROLD N. BURSTEIN, JOSEPH R. LIBERMAN,
*Examiners.*

UNITED STATES PATENT OFFICE
CERTIFICATE OF CORRECTION

Patent No. 3,198,767                              August 3, 1965

Ken Matsuda et al.

It is hereby certified that error appears in the above numbered patent requiring correction and that the said Letters Patent should read as corrected below.

Column 2, line 13, for "1,2-naphthoquinine read -- 1,2-naphthoquinone --; column 3, lines 25 and 30, the formula should appear as shown below instead of as in the patent:

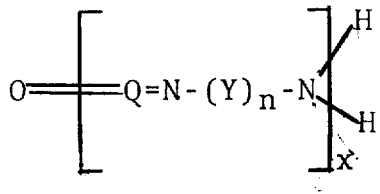

column 4, lines 20 to 28, extreme right-hand portion of the formula for "+HO$_2$" read -- +H$_2$O --; lines 60 to 62, the formula should appear as shown below instead of as in the patent:

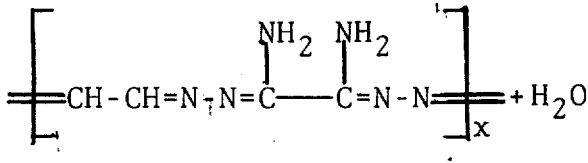

column 6, line 25, for "was" read -- and --.

Signed and sealed this 22nd day of February 1966.

(SEAL)
Attest:

ERNEST W. SWIDER                          EDWARD J. BRENNER
Attesting Officer                       Commissioner of Patents